Nov. 4, 1958
R. E. HARRINGTON
2,858,680
POWER SHAFT SAFETY SHIELDING
Filed March 13, 1956
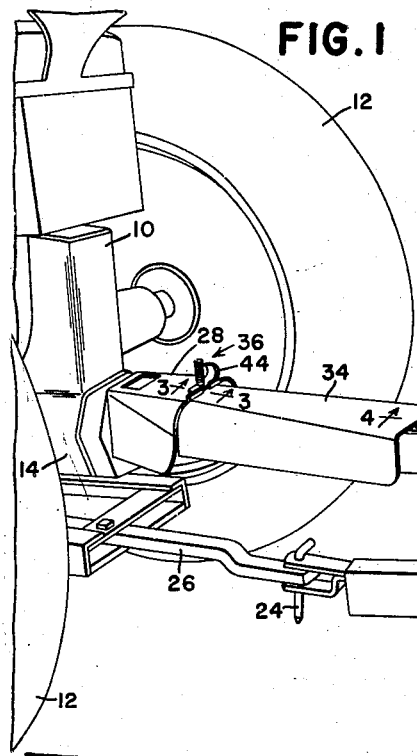
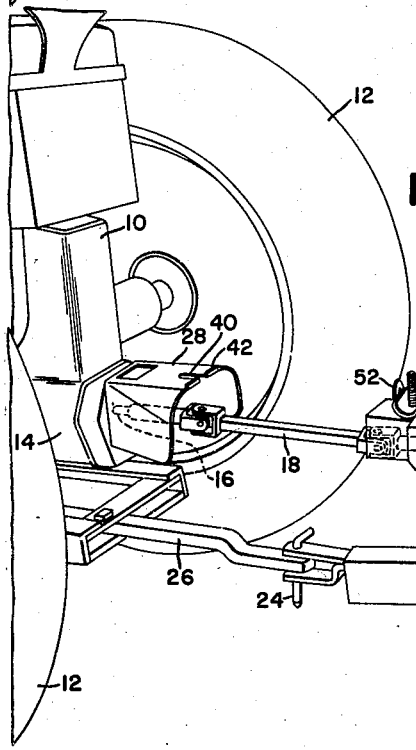
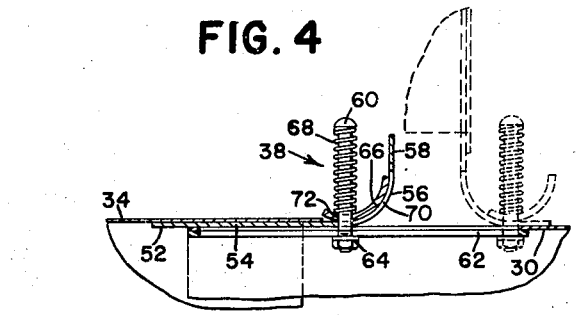
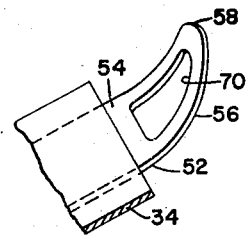
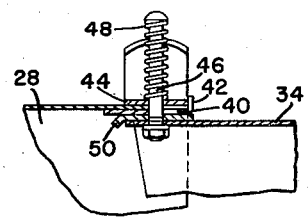
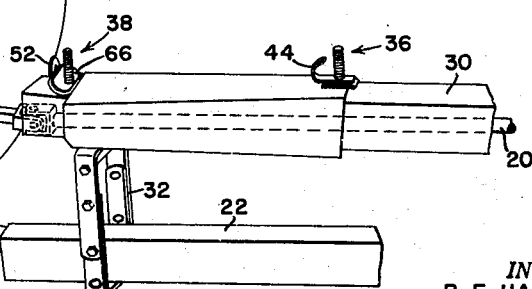
INVENTOR.
R. E. HARRINGTON United States Patent Office 2,858,680
Patented Nov. 4, 1958

2,858,680

POWER SHAFT SAFETY SHIELDING

Roy E. Harrington, Moline, Ill., assignor, by mesne assignments, to Deere & Company, a corporation of Delaware Application March 13, 1956, Serial No. 571,351

5 Claims. (Cl. 64—3)

This invention relates to safety shielding for power shafting and especially to such arrangement as used in agricultural vehicles.

The invention provides a design that is intended primarily for use in shielding the power shaft connection between a tractor and an associated implement and has for a principal object the provision of an improved and novel shield arrangement as compared with those in the prior art.

In the use and operation of articulately interconnected or coupled vehicles, such as represented by an agricultural tractor and a trailing implement having a driven part, the power take-off shaft of the tractor is connected to the driven part of the implement by an inermediate propeller shaft assembly. When the implement is disconnected from the tractor, the power take-off shaft is disconnected from the propeller shaft, and consequently, at least an intermediate part of the shield structure should also be removable. Removability of the shield structure is also desirable for the purpose of maintaining and lubricating the universal joints involved in the shafting. It was at one time determined that the most effective safety shield would be one that could not be removed, but experience has indicated that the users will remove such shields in any event, usually by destruction that makes them incapable of further use. Accordingly, the trend has been toward the provision of a shield which will not antagonize the user and which will therefore tend to make the user conscious of the desirability of replacing the shield once it is temporarily removed.

The foregoing general results have heretofore been obtained in such patented structures as those disclosed in Hardy 2,443,035 and Johnson 2,410,503. However, these constructions leave much to be desired in the way of accommodating the removed or displaced shield in a storage position. According to the present invention, the general class of shield structure shown, for example, in those two patents, is improved to the extent that although the shield cannot be completely removed, it can be moved to a storage position in which it cannot be regarded as a nuisance. It therefore has the attributes of convenience and simplicity. The invention features primarily provision of an intermediate shield of tunnel construction that normally bridges or extends between a tractor-mounted shield and an implement-mounted shield, the intermediate shield having a releasable connection at its front end to the tractor shield and a pivotal connection at its rear end to the implement shield. The pivotal connection combines transverse and upright pivots, enabling the intermediate shield to be released from the tractor shield and swung to a substantially upright position, whereupon it may be rotated 180° about its upright axis and then lowered over the implement shield, the implement and intermediate shield being so constructed that when the intermediate shield is in its storage position it embraces the implement shield from above. Consequently, the stored intermediate shield is clearly out of the way and yet is in a position to be easily and readily returned to its normal or operating position.

The foregoing and other important objects and desirable features inherent in and encompassed by the invention will become apparent as a preferred embodiment of the invention is disclosed in detail in the ensuing specification and accompanying sheet of drawings, the several figures of which will be described immediately below.

Fig. 1 is a fragmentary perspective showing a typical tractor-implement arrangement, with the shielding structure in normal or operating position.

Fig. 2 is a fragmentary perspective showing the intermediate shield in its stored position.

Fig. 3 is an enlarged fragmentary section on the line 3—3 of Fig. 1 and illustrating one form of releasable latch.

Fig. 4 is an enlarged fragmentary section showing the universal hinge means for mounting the intermediate shield, the section being taken along the line 4—4 of Fig. 1.

Fig. 5 is a fragmentary perspective of the tail part of the hinge means.

As indicated, the improvement disclosed here is primarily intended for use in the agricultural field, but it will be clear that it has wider application. Hence, the tractor-implement arrangement shown is merely representative. Likewise, such expressions as "front" and "rear" etc., used here and in the claims, are intended as terms of convenience and not of limitation.

The portion of the tractor illustrated in Figs. 1 and 2 will be recognized by those versed in the art as a typical commercially popular type having a main body 10 supported on rear traction wheels 12 and including a power take-off housing 14 from which a conventional power take-off shaft 16 projects rearwardly for connection to an intermediate or propeller shaft 18 for driving an implement shaft 20, it being understood that the implement shaft is connected to any suitable driven part (not shown) on the implement. The implement in this case is represented by a draft tongue 22 that is articulately connected at 24 at its front end to a drawbar 26 on the tractor. The connection at 24 is, of course, articulate, to accommodate relative movement of the front and rear vehicles, represented by the tractor and implement, as they encounter varying ground contour or as they turn corners. The propeller shaft 18, the power take-off shaft 16 and the implement shaft 20 constitute a power shaft that includes appropriate universal joints and telescopic connections to accommodate the aforesaid articulation.

The tractor is equipped with a front or master shield 28 normally fixed in place and housing the power take-off shaft 16, this shield being of tunnel construction so that the rear end of the power take-off shaft is exposed for connection and disconnection of the intermediate or propeller shaft 18. The implement has an elongated rear shield 30, also of tunnel construction to enclose the implement shaft 20; although, in some instances the implement shield is tubular. This shield is supported from the tongue 22 by any appropriate support as at 32. An intermediate shield 34, in which the invention primarily resides, normally bridges the front and rear shields 30 and 32 and, being of tunnel construction, encloses the propeller shaft 18 from above and at its opposite sides. The front end of the intermediate shield 34 is separably supported on or connected to the rear edge of the master shield 28 by releasable latch means 36, and the rear end of the shield 34 is connected to and supported on the front end of the implement shield 30 by universal hinge means 38.

The rear edge of the tractor or master shield 28 has a fore-and-aft slot 40 and a transverse upturned lip 42. The latch 36 comprises a pivoted latch member 44 mounted on the front end of the shield 34 by a headed pin 46 and loaded by a compression spring 48. When the shield 34 is in its normal position, the pin 46 is received by the shield slot 40 and the latch member 44 engages ahead of the shield lip 42, thus preventing the intermediate shield from rearward and upward movement relative to the tractor shield 28. For the purpose of facilitating connection, the front edge of the shield 34 is provided with a ramp or guide 50.

The hinge means, best shown in Fig. 4, includes a tail 52 rigidly secured to the rear end of the intermediate shield 34. This tail has an integral horizontal portion 54, and curves upwardly and rearwardly to afford a rocker portion 56 which terminates in a substantially upright integral portion 58. In addition, the hinge 38 includes an upright pivot member in the form of a headed pin 60 carried in a fore-and-aft slot 62 in the implement shield 30. The pin 60 carries at its lower end a nut and washer assembly 64 to confine the pin against upward separation from the slot 62. The hinge means is supplemented by retainer means comprising a retainer plate 66, arcuate to conform to the curvature of the tail 52, and a compression spring 68 which acts between the retainer plate and the head of the pin 60.

The tail has a generally triangularly shaped aperture 70 which extends throughout its curved portion 56, beginning at the horizontal portion 54 and ending at the upright portion 58. The lateral width of the aperture is substantially greater than the cross sectional area of the pin 60, whereby the shield 34 may have lateral shifting relative to the implement shield 30 to accommodate different positions of the shielding during articulation of the two vehicles. The retainer plate 66 has a smaller aperture 72 therein just fitting the pin 60, the size of the retainer plate being sufficient to overlie the aperture 70 and the size of the aperture 72 in the retainer plate being sufficient to permit the retainer plate to slide up and down on the pin under action of the spring 68.

Use and operation

During normal operation of the interconnected vehicles, the intermediate shield 34 occupies the position of Fig. 1, bridging the tractor and implement shields 28 and 30 and therefore enclosing the intermediate portion of the power shaft as represented by the propeller shaft 18. This affords an acceptable safety shielding of the power shaft. The rear end of the shield 34 is supported on the front end of the implement shield 30 via the hinge means 38, the horizontal portion 54 of the tail 52 resting on top of the implement shield 30. The forward end of the shield 34 is latched to the tractor shield 28 via the latch means 36, the latch member 44 engaging ahead of the lip 42 on the tractor shield 28. The articulate interconnections effected at 36 and 38 are sufficient to accommodate normal relative articulation between the tractor and implement.

When it is desired to displace the shield 34 for the purpose of servicing the propeller shaft 18 or for disconnecting same from the tractor power take-off shaft 16, the latch member 44 is first lifted upwardly against the spring 48 and turned rearwardly so as to clear the shield lip 42. The shield 34, which is of one piece construction, may then be shifted rearwardly, such rearward shifting being accommodated by the fore-and-aft slot 62 which receives the upright hinge pin 60, thus clearing the forward edge of the shield 34 from the rear edge of the tractor shield 28. The shield 34 may be then swung upwardly and rearwardly about the horizontal axis effected by the hinge 38 as the rocker portion 56 rocks on the upper surface of the implement shield 30, as illustrated in dotted lines in Fig. 4, in which representation it will be noted that the pin 60 has moved to the rear end of the slot 62. The shield 34 will now assume a substantially upright position, whereupon it may be rotated 180° about the vertical axis afforded by the pin 60, whereupon the open or underside of the shield 34 now faces rearwardly. The shield may then be lowered rearwardly onto the implement shield 30 to its storage position as shown in Fig. 2. It is clear that the shield 34 and the shield 30 are so constructed and dimensioned that the shield 34 receives the implement shield 30 in the embracing relationship noted.

If it is desired to transport the implement by the tractor while the shield 34 is in its storage position, that result may be achieved without requiring temporary reconnection of the shield 34, since the shield 34 embraces the shield 32 and cannot become laterally dislodged. Also, the shield 34 is out of the way while servicing is performed on the propeller shaft 18. Therefore, the stored shield is not a nuisance to the operator and in view of its convenience, it is expected that the operator will recognize its usefulness and safety advantages and will therefore replace it each time it is temporarily displaced.

Features of the invention not categorically enumerated herein will undoubtedly occur to those versed in the art, as will many modifications and alterations in the preferred embodiment disclosed, all of which may be achieved without departure from the spirit and scope of the invention.

What is claimed is:

1. Protective shielding for a power shaft between front and rear articulately coupled vehicles, comprising: front and rear shields respectively on the vehicles and respectively shielding axially spaced front and rear portions of the power shaft; an intermediate shield in the form of a tunnel having a normal position bridging the front and rear shields and enclosing the intermediate portion of the power shaft from above and at its opposite sides, said intermediate shield having front and rear ends normally proximate respectively to the front and rear shields; front means separably supporting the front end of the intermediate shield on the front shield; and universal hinge means connecting the rear end of the intermediate shield to the rear shield, said universal means including a tail on the intermediate shield and a cooperative upright pivot member on the rear shield, said tail being secured to and projecting rearwardly from the intermediate shield and having a generally horizontal portion normally resting on the rear shield, said tail being thence curved upwardly and rearwardly as a rocker portion terminating in a substantially upright portion, said rocker being adapted to rock on the second shield and when the intermediate shield is separated from the front shield and swung to an upright position, said tail having an aperture therein running through its horizontal, rocker and upright portions and said upright pivot member passing through said aperture and providing a vertical axis for rotation of the intermediate shield through 180° when in its upright position and said rocker portion enabling subsequent lowering of said intermediate shield to a storage position over the rear shield.

2. The invention defined in claim 1, in which: said second and intermediate shields are so relatively constructed that the rear shield is received within the intermediate shield in said storage position of the latter.

3. The invention defined in claim 1, in which: the tail aperture is enlarged both fore-and-aft and laterally relative to the pivot member to afford play during articulation of the vehicles when the intermediate shield is in its normal position; and retainer means is positioned over the tail aperture, and secured to the pivot member, said retainer means including a retainer plate apertured to fit the pivot member and overlying the tail aperture to prevent separation of the intermediate and second shields.

4. The invention defined in claim 3, in which: the retainer is arcuate in section to conform to the curvature of the tail.

5. The invention defined in claim 3, in which: the rear shield has a fore-and-aft slot receiving the pivot member to enable rearward shifting of the intermediate shield in its normal position for clearing the front end of the intermediate shield from the front shield upon separation of the front means.

References Cited in the file of this patent

UNITED STATES PATENTS

| | | |
|---|---|---|
| 2,410,503 | Johnson | Nov. 5, 1946 |
| 2,443,035 | Hardy | June 8, 1948 |
| 2,514,089 | Punsky | July 4, 1950 |
| 2,612,763 | Hansen | Oct. 7, 1952 |